US006519771B1

(12) United States Patent
Zenith

(10) Patent No.: US 6,519,771 B1
(45) Date of Patent: Feb. 11, 2003

(54) SYSTEM FOR INTERACTIVE CHAT WITHOUT A KEYBOARD

(76) Inventor: Steven Ericsson Zenith, 1249 Lakeside Dr., #3046, Sunnyvale, CA (US) 94086

( * ) Notice: Subject to any disclaimer, the term of this patent is extended or adjusted under 35 U.S.C. 154(b) by 0 days.

(21) Appl. No.: 09/461,564

(22) Filed: Dec. 14, 1999

(51) Int. Cl.[7] .......................... H04N 7/025; G09G 5/00
(52) U.S. Cl. ..................................... 725/32; 345/758
(58) Field of Search ......................... 348/14.08, 564;
725/13, 16, 32, 109, 120, 136, 141, 113,
110; 345/751–759; 709/230, 231, 204–207

(56) References Cited

U.S. PATENT DOCUMENTS

| | | | | |
|---|---|---|---|---|
| 5,694,163 A | * | 12/1997 | Harrison | 725/110 |
| 5,737,011 A | * | 4/1998 | Lukacs | 348/14.09 |
| 6,081,830 A | * | 6/2000 | Schindler | 709/204 |
| 6,256,663 B1 | * | 7/2001 | Davis | 709/204 |

OTHER PUBLICATIONS

Tribes Scripting News: Apr. 4, 1999, Picture 1. http://www.planettribes.com/presto/, http://www.planettribes.com/presto/ pack/screen –jobmenu.jpg, http://www.planettribes.com/presto/img/jobmenu.jpg.*

3D Gamers—Starsiege: TRIBES: http://www.3dgamers.com/games/tribes/.*

* cited by examiner

Primary Examiner—Bhavesh Mehta
Assistant Examiner—Hunter Lonsberry
(74) Attorney, Agent, or Firm—Workman, Nydegger & Seeley

(57) ABSTRACT

Abstract of the Disclosure A user interface device has a graphical user interface that can simultaneously display a combination of television and related Internet content, along with predetermined responses to the television or video content. The predetermined responses may offer a set of choices, and selecting one of the choices results in sending the chosen response to a chat room to be added to the chat stream. Selecting a choice may alternatively cause a second set of responses to be displayed, the second set corresponding to the choice that was selected. The predetermined responses may be standardized responses that are broadcast to many user interface devices, or the predetermined responses may be customized responses input by the user. Alternatively, the user may define a profile that provides a subset of the available predetermined responses, the subset having a particular style selected by the viewer. The predetermined responses may take the form of text communications, static or dynamic graphic icons, audio or video. Having the predetermined responses available allows for interactive communication without the need for a keyboard to type in responses.

32 Claims, 4 Drawing Sheets

SYSTEM FOR INTERACTIVE CHAT WITHOUT A KEYBOARD

BACKGROUND OF THE INVENTION

Communication networks such as the Internet have recently experienced dramatic growth in popularity and use. An advantage of the Internet that has helped to fuel this growth is the availability of quick and easy communication between widely disparate individuals and networks regarding virtually limitless topics. Thus, not only does the Internet provide for traditional communication, such as between a pair of friends, relatives or coworkers, but the Internet also facilitates communication between strangers and groups of strangers.

Chat is one of the various relatively new forms of communication provided by the Internet. Chat in this sense does not refer to audible conversation engaged in by people gathered together in one place, but rather to textual conversations between people that are connected by the Internet to the same chat room, which may be a file on a server. In this case, a participant in such a chat room types a message into his or her computer and the message virtually immediately appears on all the other computers connected to that chat room.

One of the most popular ways to chat via the Internet is called Internet Relay Chat (IRC). IRC employs special IRC servers that run the chat rooms, and special client/server software that allows client computers to send and receive chat via the IRC servers. The IRC servers may be connected together as a network. Various client computers from around the world may be connected via the Internet to these chat rooms, allowing conversations between disparate individuals who may typically never meet or know each other outside of the chat room experience.

It is common for a chat room to be related to a particular topic, with the participants attracted to that chat room by their interest in the topic. While many chat rooms exist regarding various topics, one popular theme for chat rooms is mass entertainment, such as television shows. Thus, chat rooms may exist devoted to a popular television show, such as "The Simpsons®." Typically, viewers are forced to choose whether to watch television or to participate in a chat room, since most Internet connections are not provided by a television but rather by a separate device such as a computer that may be disposed at a separate location from the television. Moreover, both the television and the computer may be generally immobile, such as with a personal computer located on a desk in a study and a television located in a family room. Thus, many chat participants may converse in a chat room related to a television show before or after the show has played, although some fans may be connected to the chat room while the show is playing.

The advent of interactive television such as provided by WebTV® Networks offers the possibility of being connected to the Internet and watching television simultaneously via a single user interface device. Thus it is possible for a user to be watching a television show and on the same television be connected to a chat room that somehow relates to that show.

FIG. 1 is a diagram of an interactive television system 20 that enhances a television viewing experience by integrating television programming with enhanced content from the Internet or from the broadcaster. The broadcast of a baseball game can, for example, be enhanced by retrieving relevant information (for example, a batter's batting statistics 22) from the Internet and displaying that information at an appropriate point in the baseball game (for example, when the batter 25 is batting). If the batter's batting statistics are already displayed by the broadcast, then statistics 22 may involve the team's standings, or the number of wins needed to clinch a playoff spot, or a variety of other topics that may be accessed via the Internet.

System 20 includes a server 28 maintained by the broadcaster, a broadcasting antenna 30, a receiver unit 33, a television set 35, and an Internet access point 37. Receiver unit 33, which may be a set-top box, includes a receiving antenna 38 and a remote control unit 39. A viewer uses remote control unit 39 to control the receiver unit and/or to interact with interactive television content via the receiver unit. A video link 40 couples receiver unit 33 to television set 35 so that the receiver unit can use the television set as a display device.

FIG. 2 is a block diagram of receiver unit 33. TV interface circuitry 42 of the receiver unit 33 includes a tuner that is tuned to receive broadcast television video and to remove a television carrier signal. TV interface circuitry 42 digitizes the video signal after the carrier signal has been removed. Software executed by a digital processor 44 receives the digitized signal from TV interface 42 and decodes and checks the digitized signal for errors. Receiver unit 33 drives the television set 35 via video encoder 46 and audio digital-to-analog converter 48. Digital processor 44 realizes a type of web browser that can access the Internet via a modem 50. Receiver unit 33 includes an infrared interface 52 for receiving infrared transmissions from remote control unit 39. Local storage 55 provides memory for processor 44, and may house a web browsing program, such as Microsoft Internet Explorer® or Netscape Navigator®.

Television video 60 is broadcast over the airwaves from broadcasting antenna 30 to receiving antenna 38 of receiver unit 33. Alternatively, television video may be broadcast via cable or satellite or other known means. The broadcast signal may include digital data. At an appropriate time in the baseball game when the broadcaster wishes batter statistics 22 to be displayed (for example, when batter 25 appears on the television screen), the broadcaster broadcasts a trigger 66 along with the television video 60. Trigger 66 contains a Uniform Resource Locator (URL) that identifies an information resource 70 on the broadcaster's server 28 or another server, not shown. In this case, information resource 70 is a web page containing the batter's statistics.

Receiver unit 33 receives trigger 66, accesses the Internet via Internet access point 37, uses the URL from the trigger to retrieve the web page of batter statistics from server 28, and then displays the batter statistics 22. In this way, broadcasters use triggers to have their viewers' receiver units retrieve information from the Internet and display that information in concert with their programming. Receiver unit 33 and television 35 together form a user interface device that is a client of the server 28 while connected to the Internet, similar to a personal computer that is connected to the Internet by an Internet service provider (ISP).

Like traditional television, interactive television may be most conveniently operated via a remote control unit such as remote control 39. Similarly, the widespread deployment and use of a graphical user interface (GUI) for personal computers has made the mouse a favored means for user input. Personal digital assistants (PDAs), telephones and laptop computers may all have a GUI, affording ease of communication by simply selecting an icon on the screen. Chat, on the other hand, requires a keyboard of some sort or some other means of inputting and sending text to the chat room, such as voice recognition software or handwriting recognition software. Unfortunately, most user interface devices that are not typically operated with a keyboard, such as interactive televisions, PDAs, and telephones, do not have the expensive processing power and/or memory for running large software programs associated with voice or handwriting recognition. Thus it is difficult to participate in chat rooms with these devices.

Summary

In accordance with the present invention, a user interface device having a graphical user interface can send dialogue or messages to a chat room via selection with a pointing device, such as a remote control, mouse or screen pressure for the case of a touch screen display. The chat messages can be prescripted and may be provided via a selection tree that allows a user to select a most appropriate response. The user may have selected a user profile that guide the style of the messages that may be input to the chat room. The user may also have personalized messages that were previously input and are then available for selection by the pointing device. The messages offered for selection by the pointing device may also vary depending upon the chat room in which the user is participating. In one embodiment the chat room is related to a television show and both are simultaneously provided on a user interface device.

DESCRIPTION OF THE PREFERRED EMBODIMENT

Figure 1:
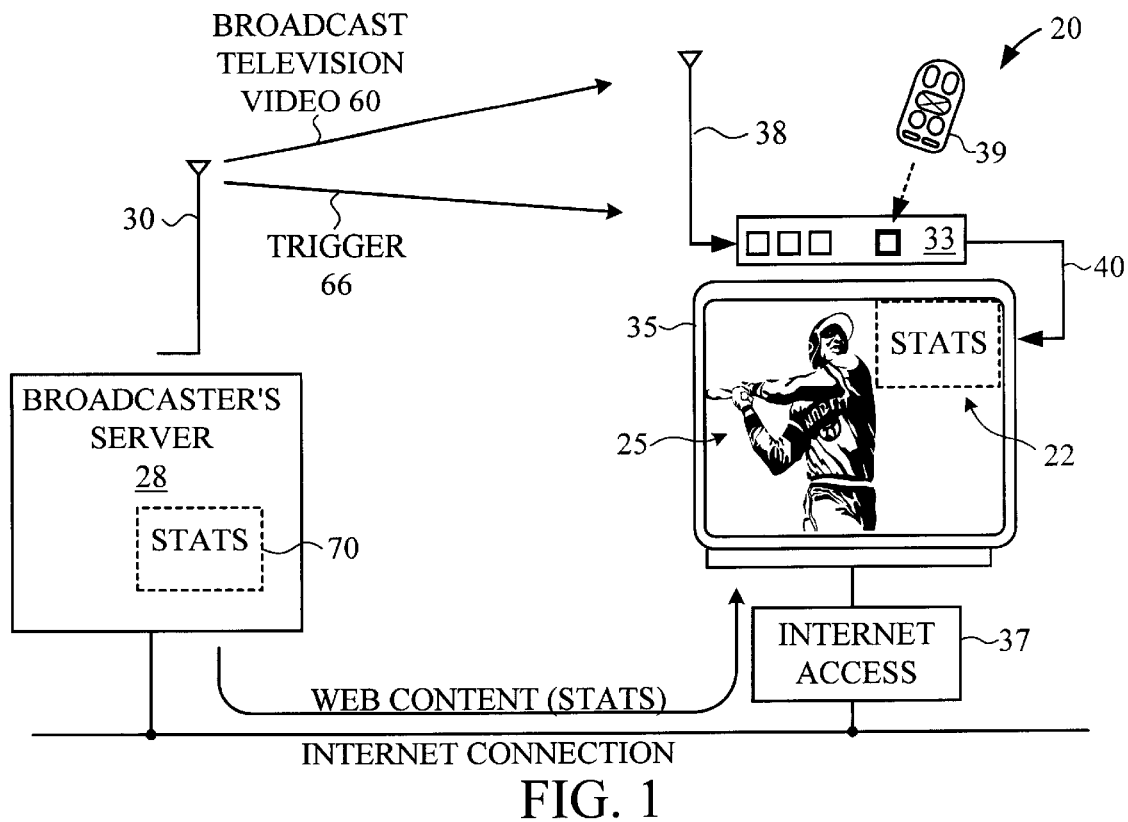
FIG. 1 is a simple plan view diagram of an interactive television system.
Figure 2:
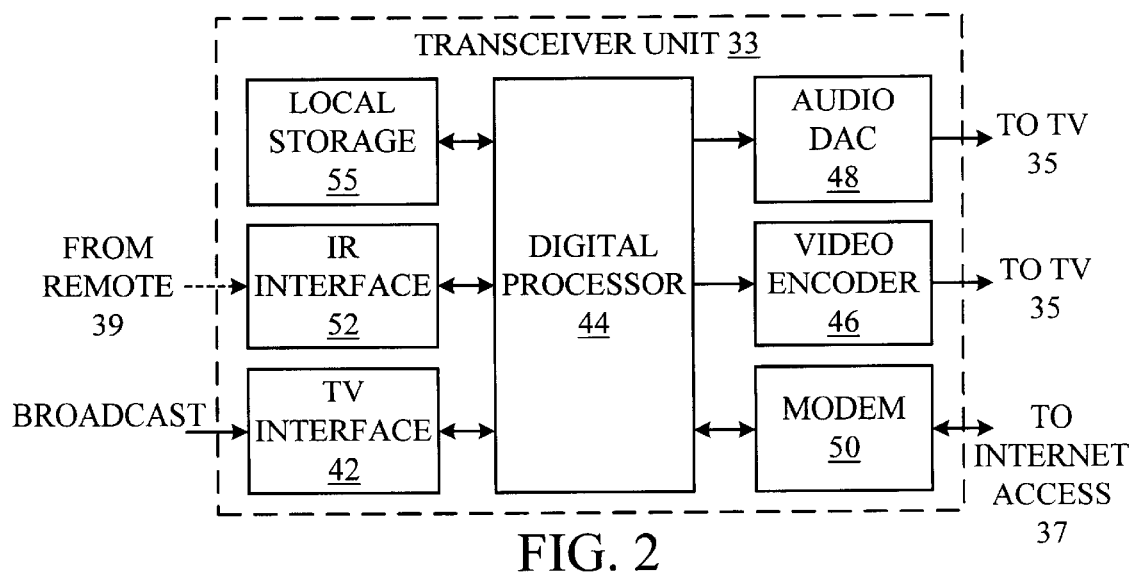
FIG. 2 is a block diagram of a transceiver unit of the system of FIG. 1.
Figure 3:
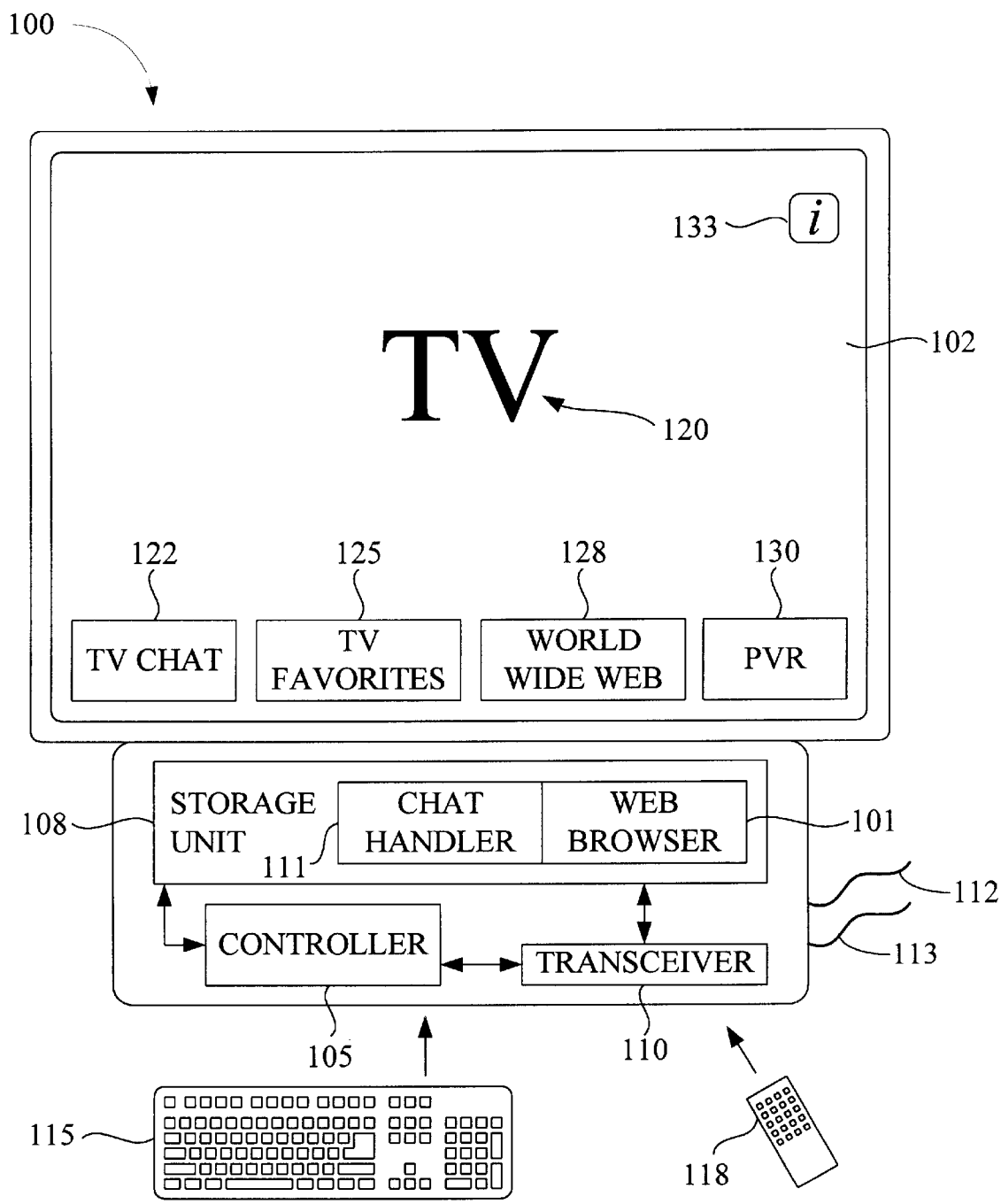
FIG. 3 is a schematic view of a user interface device that can display both television content and Internet content.

FIG. 3 shows a user interface device 100 including a display screen 102 such as a cathode ray tube (CRT), flat panel display, or touch screen display. In general, the user interface device may take the form of a personal computer, a television having a set-top box or other means of processing and transmitting communications, a laptop or handheld computer, a personal digital assistant (PDA), a telephone, an internet appliance or other device having the communications, processing and display capabilities for performing the present invention. The user interface device 100 in this embodiment also includes a controller 105 that manages a transceiver 110. Controller 105 may include a digital processor, an application specific integrated circuit (ASIC) and local memory, such as semiconductor memory. Transceiver 110 may also contain local memory such as semiconductor memory. A storage unit 108 such as a disk drive or additional semiconductor memory may be provided in communication with controller 105 and transceiver 110.

Transceiver 110 may receive television broadcasts and digital data such as Internet or network content via a first channel 112. A second channel 113 can be provided for sending communication to the outside world such as a network, the Internet, broadcast servers or other servers. Channels 112 and 113, which may be combined, may be take the form of twisted pairs of telephone lines, coaxial cable or fiber-optic cable, or may be a link to an antennae for wireless communication. In one embodiment, both broadcast signals such as television broadcasts and an Internet connection are provided by single channel 112. This single channel may be a cable coupled to a cable modem at transceiver 110. In another embodiment, both broadcast signals such as television broadcasts and an Internet connection may be provided by channel 112 connected to a satellite receiver such as a satellite dish, while channel 113 provides another communication link. The means for receiving information by the user interface device may be termed a source channel 112, and the means for transmitting information from the user interface device may be termed a back channel 113.

The transceiver 110 also can receive signals from an optional keyboard 115 and a pointing apparatus 118 such as a mouse or remote control via a wire or the infrared interface, and provides signals via a video encoder/decoder and digital-analog converter for presenting information on the display 102. The display 102 provides a graphical user interface (GUI) managed by controller 105. The device 100 can take the form of a personal computer, a laptop computer, an intelligent network appliance such as a handheld network appliance or telephone, or an interactive television set.

In one embodiment, the device 100 is a television connected with a set-top box such as a WebTV® Plus Internet terminal, as described in U.S. patent app. Ser. No. 09/296,542, which is incorporated by reference herein. The transceiver 110 in this case has TV interface circuitry including a tuner that is tuned to receive the broadcast television video and to remove a television carrier signal. After the carrier signal is removed, TV interface circuitry digitizes the resulting video signal. In addition to the television interface, transceiver 110 preferably includes an infrared interface, a digital-analog converter, a video encoder/decoder and a modem. Software executed by the controller 105 receives the digitized signal from TV interface and decodes and checks the digitized signal for errors. Transceiver 110 drives the display 102, which in this embodiment is a television set, via video encoder and audio digital-to-analog converter. The user interface in this embodiment has been specialized for viewing on an interlaced TV screen rather than a computer monitor. The controller 105 runs a web browser that can access the Internet via a modem or transmitter contained in the transceiver.

Device 100 can simultaneously display both television content and Internet content. The storage unit 108 has stored thereon an operating system, such as Windows CE®, and a web browser program 101 such as Microsoft Internet Explorer®, Netscape Navigator® or the WebTV® browser. The web browser program is run by the controller for accessing the Internet from the user interface device. Also stored on the storage unit is a chat handler program 111, which may for convenience be assembled from ActiveX or component object module (COM) components. The chat handler program is run by the controller and manages connectivity between the user interface device 100 and IRC servers. A chat buffer is provided for temporary storage of chat messages in the local memory of transceiver 110 or in storage unit 108.

FIG. 3 depicts an opening screen that a viewer may encounter, including a television show 120 and several viewing choices, such as TV chat 122, TV favorites 125, World Wide Web 128 and personal video recorder (PVR) 130. Also present in an upper right corner of the display screen 102 is an icon 133 for choosing to view interactive TV. In general, the device 100 can display pure television broadcasting, pure web pages, or a combination of television and web pages. To combine television and web pages, television programs can be inserted as tags within hypertext transfer markup language (HTML) documents that are interpreted by the web browser program 101, in accordance with the Advanced Television Enhancement Forum (ATVEF) Specification, incorporated by reference herein. The television programming thus inserted can be rendered as a small proportion of the display screen, with the web page occupying the remainder of the screen. Alternatively, by tagging the television as a background and specifying a reduced size for the other content, the web page can overlay a part of the larger television show displayed on the screen.

Selecting TV chat 122 by the pointing device, for example, sends a request from the chat handler to an IRC server to join a chat room. The chat room selected may correspond to the particular television show 120 being displayed. That television show 120 may be identified by the chat handler via a unique identifier assigned to the show and broadcast with the television signal. Such unique identifiers are typically provided by the broadcaster. The chat dialogue can be displayed simultaneously with the television show in a variety of display modes. The combined television and chat content are provided as television markup language (TVML) documents, which are a combination of JavaScript (JS) and dynamic hypertext transfer markup language (DHTML).

The chat room may correspond to a television signal in a variety of ways besides simple corresponding to the individual show that is currently broadcast. For example, the chat room may correspond to a replay of a past television show, such as a past episode in a series, or all episodes that are currently being broadcast. Alternatively, the chat room may correspond to a television channel, such as Fox® News Network. In addition, the chat room may correspond to a category, such as professional football, that may be selected by the viewer while watching a particular football game.

The chat which is displayed on the user interface device may be audio or video instead of text. Audio or video chat may be sent from the user interface device to the chat room. For example, the viewer may speak into a microphone connected to the user interface device to create an audio clip, which is then sent to the IRC server chat room to be broadcast to all the user interface devices connected to that chat room.

Figure 4:
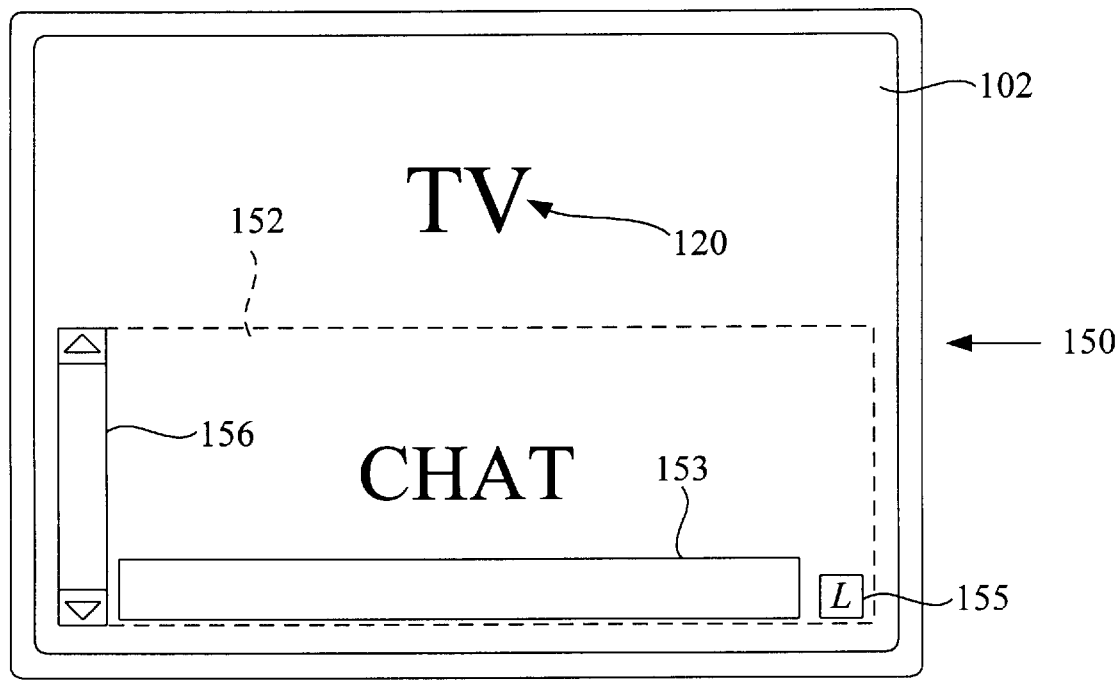
FIG. 4 is a schematic view of a first mode of display on the user interface device of both a television program and chat related to that program.

FIG. 4 shows the display screen 102 presenting the combination of television and Internet chat according to a first display mode 150. In this mode, the television show 120 and the chat dialogue 152 occupy similar proportions of the display screen 102. The chat dialogue may overlay the television show or have a different background. A link 155 is displayed adjacent the chat dialogue, the link providing a convenient means to switch the display to a second mode in which the chat dialogue is more pronounced. A more complete description of switching between several modes of interactive television is provided in U.S. Patent Application "Multimode Interactive Television Chat," invented by Steven Ericsson Zenith, filed on even date herewith and incorporated by reference herein. A send bar 153 is provided for sending chat messages, and a scroll bar 156 allows the user to scroll through the chat dialogue. The send bar 153 in this mode is used by inputting text, such as with the keyboard 115.

Figure 5:
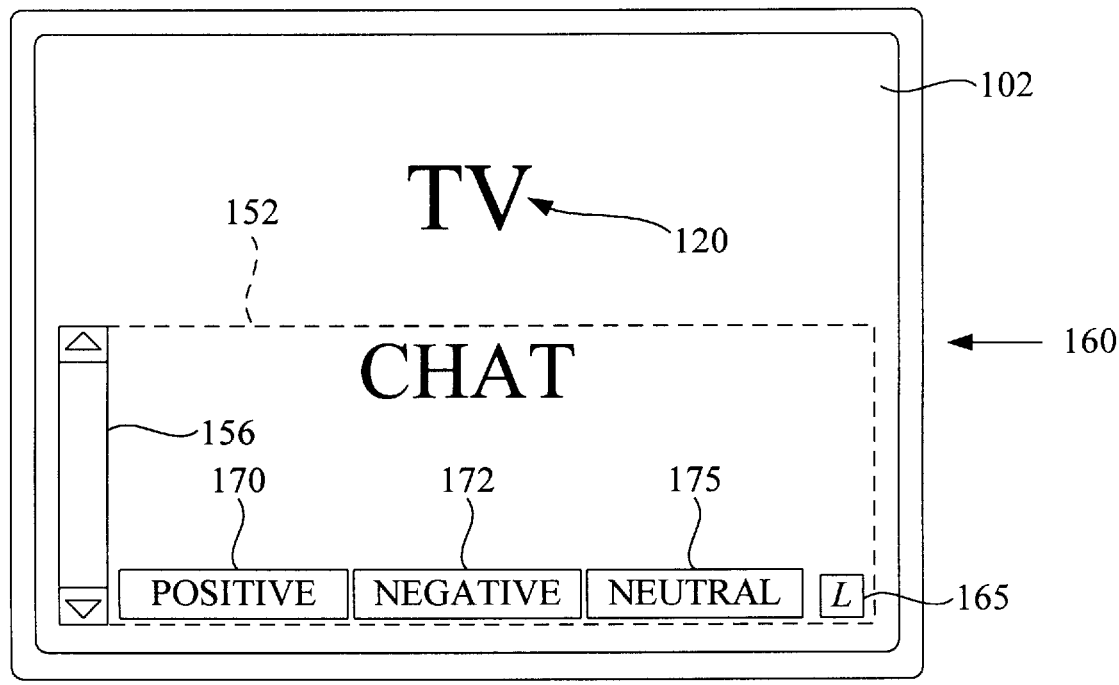
FIG. 5 is a schematic view of a second mode of display on the user interface device of both a television program and chat related to that program.

FIG. 5 shows the display mode 160 that results from selecting and actuating link 155 of the previous figure. In this mode the send bar has been replaced with three response choices: positive 170, negative 172 and neutral 175. A link 165 is provided to switch the display back to the first mode. Selection of one of the response choices may send a signal to the chat room with that choice, or that selection may act as a link to a subcategory of response choices. The subcategory in this embodiment may be presented as another TVML having a uniform resource identifier (URI) address specified by the response choice link. Different categories of response and corresponding chat room dialogue may be transmitted as different linked web pages from the IRC server. Alternatively, the chat handler program of the user interface device may contain instructions to display according to the different modes, as locally stored TVML documents. For other embodiments in which the user interface device is a PDA, telephone or other device, the documents may be interpreted according to another markup languages, such as HTML.

Figure 6:
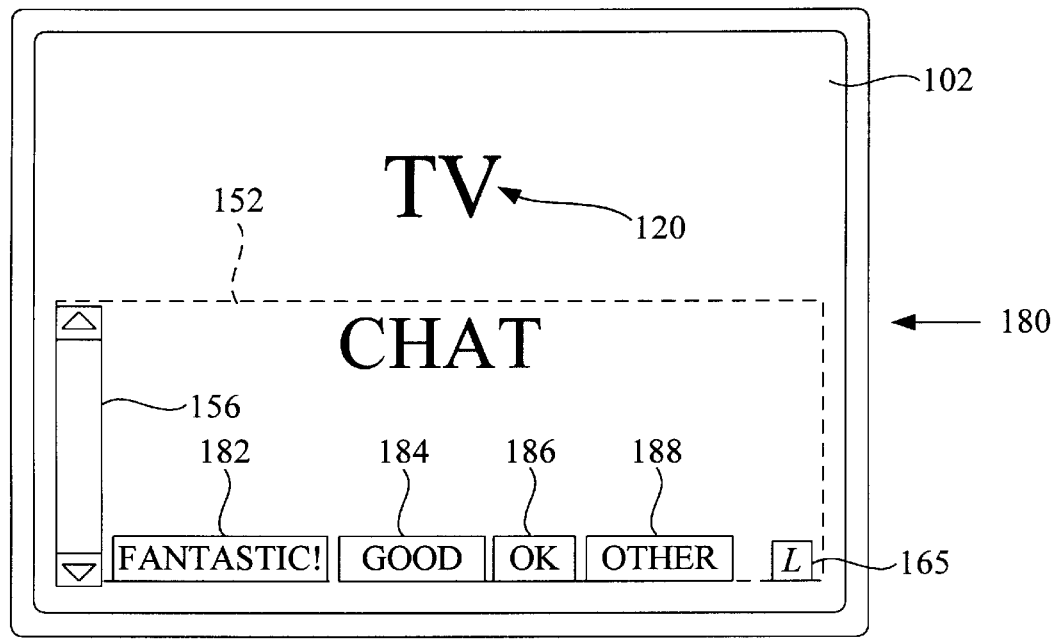
FIG. 6 is a schematic view of a third mode of display on the user interface device of both a television program and chat related to that program.

FIG. 6 shows a third display mode 180 that results from selecting and actuating the positive 170 response of the previous figure. In the send bar area four sub-responses area available for selection by a pointing device: fantastic 182, good 184, OK 186, and other 188. Selecting other 188 leads to another list of sub-responses, whereas selecting fantastic 182, good 184, or OK 186 causes the user interface device to send that response to the chat room. In this manner the user is able to submit chat messages to the chat room without the need for a keyboard or other text entry device.

The prompt for presenting several chat responses or categories may be user initiated, as described above, or may be presented in response to chat dialogue or television programming received at the user interface device. For example, the chat dialogue may have a question or exclamation, which can easily be identified by the user interface device by monitoring for a question mark or exclamation point. Alternatively, the television program may similarly be monitored by the close captioned text sent with the video signal. The prompt can also be sent with the programming, via a trigger or other message. For example, a television show may include a prompt that appears in a corresponding chat room dialogue such as: "Do you believe her?" While the user interface device is in the click-chat mode that offers prescripted responses, the positive, negative and neutral responses would then appear. Similarly, an advertising video for an automobile may include a prompt that appears in the chat dialogue asking: "What's your favorite color?" Prescripted responses offering various colors may then be offered for selection by the viewer. optionally, subcategories of colors, including interior/exterior colors may then be presented for selection.

The responses can be personalized, either by user input that creates the prescripted responses for later usage, or by selecting a profile that offers a personalized style, such as "Surfer Dude," "Business Professional," or "Computer Nerd." The profile may be selected at the beginning of a response tree or may be part of a greater set of profiles that may be stored on the user interface device.

Figure 7:
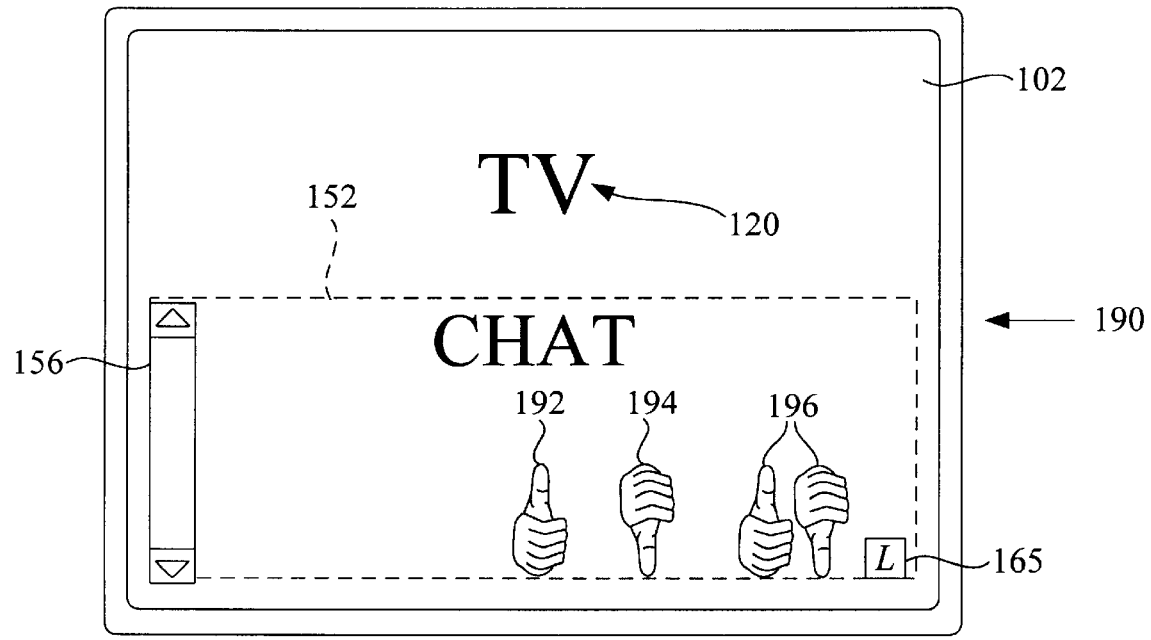
FIG. 7 is a schematic view of a fourth mode of display on the user interface device of both a television program and chat related to that program.

The prescripted responses need not be limited to text communications. For example, in the mode 190 shown in FIG. 7, icons may be displayed to provide prescripted responses, such as a thumb pointing up 190, a thumb pointing down 192 and a thumb pointing up and down 194. These responses do not have to be static graphic icons, but may be graphics that run dynamically after being selected when displayed as part of the chat stream. Also possible are prerecorded voice or video messages that provide prescripted responses.

In addition to default prescripted chat may be offered, personalized chat responses may be input by a user, allowing the user to later select those responses with a pointing device rather than type the responses in. In the opening mode shown in FIG. 3, the user can enter a settings menu item where a list of various settings that can be adjusted is provided. In selecting the TV chat settings, the device may prompt the user to enter the responses the viewer wishes to have displayed when in a Click Chat mode. Various responses can then be entered to have predetermined responses available for questions, statements, exclamations, positive, negative and neutral feedback, etc. At this point audio or video responses can also be entered, so that later a selection of a positive response with a pointing device can send to the chat room a clip of the user exclaiming "Yeah Baby," for example, which is then played as part of the chat dialogue. It is also possible to enter a chat response that is typed while participating in a chat room as a prescripted response, for example by right clicking on the response with a mouse, which then provides a choice of entering the typed response as a new response to replace a current response, and then provides categories for that response to be filed.

Thus, a method, device and system for allowing a user to participate in chat rooms without the use of a keyboard is provided in accordance with the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. In a device having a display with a graphical user interface, a method comprising:
   receiving a video signal at the device;
   receiving at the device chat communications relating to the video signal;
   displaying the video signal and the chat communications on the display;
   storing, by a user of the device, one or more custom chat responses personalized by the user for subsequent selection; and
   displaying with the video signal and the chat communications the one or more custom chat responses to the video signal or chat communications.

2. The method of claim 1, further comprising selecting at least one of the one or more custom chat responses and thereby sending the at least one response to a chat server.

3. The method of claim 1, wherein storing the one or more custom chat responses occurs prior to receiving the video signal at the device.

4. The method of claim 1, wherein storing the one or more custom chat responses occurs while receiving the video signal at the device.

5. The method of claim 1, wherein the video signal is a television show.

6. The method of claim 1, wherein at least one of the one or more custom chat responses comprises audio content.

7. The method of claim 1, wherein at least one of the one or more custom chat responses comprises a graphic content.

8. In a device having a display with a graphical user interface, a method comprising:
   receiving a video signal and a plurality of chat responses for user selection at the device, wherein the plurality of chat responses are grouped according to one or more user communication styles,
   selecting a user communication style, and
   displaying the video signal and one or more chat responses that correspond to the selected user communication style.

9. The method of claim 8, wherein at least one of the one or more chat responses provides a link to one or more additional chat responses.

10. The method of claim 8, wherein the video signal is a television show.

11. The method of claim 8, wherein the one or more chat responses correspond to the video signal.

12. The method of claim 8, further comprising storing the one or more chat responses in the device prior to receiving the video signal at the device.

13. The method of claim 8, the plurality of chat responses are received at the device along with the video signal.

14. The method of claim 8, wherein at least one of the one or more chat responses comprises graphic content.

15. The method of claim 8, further comprising displaying chat communications on an area on the display adjacent to the one or more chat responses.

16. A device having a graphical user interface and a display, comprising:
   means for displaying video and chat corresponding to the video,
   means for displaying a plurality of responses to the video or chat, wherein the plurality of responses are either (i) grouped according to one or more user communication styles, or (ii) personalized by a user for subsequent selection, and
   means for actuating a response of the responses, and thereby adding that response to the chat.

17. The device of claim 16, wherein the responses comprise text communications.

18. The device of claim 16, wherein the responses comprise graphic icons.

19. The device of claim 16, wherein the responses comprise audio communications.

20. The device of claim 16, wherein the responses comprise video communications.

21. A computer-readable medium having computer-executable instructions for performing the steps of:
   displaying, according to a set of instructions stored on the medium, video, chat regarding the video, and a plurality of responses to the video or chat, wherein the plurality of responses are either (i) grouped according to one or more user communication styles, or (ii) personalized by a user for subsequent selection;
   selecting at least one response of the plurality of responses, and thereby sending the at least one response to a chat server; and
   displaying, according to the set of instructions, the video, the chat, and the at least one response.

22. The method of claim 1, wherein the one or more chat responses are grouped according to one or more user communication styles, and wherein the method further comprises selecting one of the one or more user communication styles.

23. The method of claim 1, wherein the one or more custom chat responses correspond to one or more general response categories.

24. The method of claim 8, further comprising sending from the device to a server at least one of the one or more displayed chat responses.

25. The method of claim 8, wherein at least one of the one or more chat responses comprises audio content.

26. The method of claim 8, wherein at least one of the one or more chat responses comprises a custom response personalized by the user for subsequent selection.

27. The computer-readable medium of claim 21, wherein the computer-executable instructions perform the steps of:

selecting a user communication style, and displaying one or more responses that correspond to the selected user communication style.

28. The computer-readable medium of claim 21, wherein the computer-executable instructions perform the steps of:

storing at least one custom response personalized by the user for subsequent selection; and displaying the at least one custom response.

29. The computer-readable medium of claim 28, wherein the at least one custom response corresponds to on e or more general response categories.

30. The computer-readable medium of claim 21, wherein the computer-executable instructions perform the step of sending the at least one response to a chat server.

31. The computer-readable medium of claim 21, wherein the one or more custom responses comprises at least one of (i) audio content, (ii) graphic content, or (iii) video content.

32. The computer-readable medium of claim 21, wherein at least one of the plurality of responses provides a link to one or more additional responses.

\* \* \* \* \*

UNITED STATES PATENT AND TRADEMARK OFFICE
CERTIFICATE OF CORRECTION

PATENT NO. : 6,519,771 B1
DATED : February 11, 2003
INVENTOR(S) : Steven Ericsson Zenith It is certified that error appears in the above-identified patent and that said Letters Patent is hereby corrected as shown below:

Title page,
Item [57], ABSTRACT,
Line 1, before "A user interface device" please delete "Abstract of the Disclosure"

Column 4,
Line 8, after "may be combined, may be" please delete "take" and insert
-- taken in --

Column 6,
Line 56, before "subcategories of" please delete "optionally," to -- Optionally, --

Column 10,
Line 4, after "corresponds to" please change "on e" to -- one --

Signed and Sealed this

Thirtieth Day of December, 2003

JAMES E. ROGAN
*Director of the United States Patent and Trademark Office*